(12) United States Patent
Gallant (10) Patent No.: US 10,085,566 B1
(45) Date of Patent: Oct. 2, 2018

(54) MARINE VESSELS AND MODULAR DECK AND SEATING CONFIGURATIONS FOR MARINE VESSELS

(71) Applicant: Brunswick Corporation, Lake Forest, IL (US)

(72) Inventor: Danny Gallant, Victoriaville (CA)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/668,165

(22) Filed: Aug. 3, 2017

(51) Int. Cl.
| | |
|---|---|
| *B60N 2/22* | (2006.01) |
| *A47C 17/04* | (2006.01) |
| *B60N 2/02* | (2006.01) |
| *B60N 2/30* | (2006.01) |
| *B63B 29/04* | (2006.01) |
| *B63B 29/00* | (2006.01) |
| *A47C 17/00* | (2006.01) |

(52) U.S. Cl.
CPC ............ *A47C 17/04* (2013.01); *B60N 2/0292* (2013.01); *B60N 2/22* (2013.01); *B60N 2/305* (2013.01); *B63B 29/04* (2013.01); *A47C 17/00* (2013.01); *B63B 29/00* (2013.01)

(58) Field of Classification Search
CPC ...................................... A47C 17/04
USPC ......................................... 114/363
See application file for complete search history.

(56) References Cited

U.S. PATENT DOCUMENTS

| | | | | |
|---|---|---|---|---|
| 2,804,229 A | * | 8/1957 | Bergh | A45C 11/24 16/277 |
| 3,782,592 A | * | 1/1974 | Bergh | E05D 7/12 220/829 |
| 4,099,647 A | * | 7/1978 | Bergh | B65D 43/167 16/382 |
| 6,230,648 B1 | * | 5/2001 | Davidson | B63B 29/04 114/363 |
| 7,513,211 B1 | * | 4/2009 | Farb | B63B 29/02 114/363 |

(Continued)

FOREIGN PATENT DOCUMENTS

| | | |
|---|---|---|
| EP | 2476583 | 7/2014 |
| JP | 2003302715 | 10/2003 |
| WO | 1999/29534 | 6/1999 |

OTHER PUBLICATIONS

Lund Boats, Aluminum Fishing Boats, 1875 Impact, dated May 10, 2017.

(Continued)

*Primary Examiner* — S. Joseph Morano
*Assistant Examiner* — Jovon E Hayes
(74) *Attorney, Agent, or Firm* — Andrus Intellectual Property Law, LLP (57) ABSTRACT

A marine vessel has a deck surface having a recessed cavity; a seat module having a seating member, an engagement member, and a hinge that couples the seating member to the engagement member; and a retainer configured to retain the engagement member with respect to the recessed cavity. The seating member is pivotable about the hinge into and between a closed position in which the seating member lies flush with the deck surface and covers the recessed cavity and an open position in which the seating member provides seating for user and the recessed cavity is exposed and provides leg room for the user.

20 Claims, 8 Drawing Sheets

(56) References Cited

U.S. PATENT DOCUMENTS

| | | | | |
|---|---|---|---|---|
| 7,677,668 | B2* | 3/2010 | Olsen | B60N 2/206 297/378.14 |
| 7,914,077 | B2* | 3/2011 | Linkner | B60N 2/01583 296/65.03 |
| 8,336,942 | B2* | 12/2012 | Yamashita | B60N 2/0155 296/65.03 |
| 8,457,527 | B2* | 6/2013 | Takata | G03G 15/605 16/286 |
| 8,517,466 | B1* | 8/2013 | Wizorek | B63B 29/04 297/115 |
| 8,894,031 | B2* | 11/2014 | Sailer | B60N 2/01 248/352 |
| 8,899,169 | B1* | 12/2014 | Jaziri | B63B 19/16 114/363 |
| 8,899,916 | B2* | 12/2014 | McCune | F02K 3/04 415/124.1 |
| 9,021,975 | B1* | 5/2015 | Fodor | B63B 29/04 114/363 |
| 9,126,664 | B1* | 9/2015 | Denson | B63H 20/32 |
| 9,260,166 | B1* | 2/2016 | Fodor | B60N 2/995 |
| 9,381,836 | B2* | 7/2016 | Sawada | B60N 2/3011 |
| 9,457,724 | B2* | 10/2016 | Lu | B60R 5/045 |
| 2011/0080027 | A1* | 4/2011 | Nakao | B60N 2/01583 297/311 |

OTHER PUBLICATIONS

MuskieFirst, Seat/Casting Deck, Muskie Boats and Motors, Muskie Fishing, dated May 8, 2017.
Ski Nautique 200, Closed Bow Water Ski Sports, Boat World Records Start Here, http://www.nautique.com/contact/brochure-landing, date visited Jun. 15, 2017.
Ski Nautique Manual, Revised Jul. 19, 2002, 84 pages.
Alumacraft—flip down casting platform with jump seats (options), www.alumacraft.com/images/options/img-10.jpg, visited May 8, 2017.
G3 Boats angler_v172_c_flip_deck_seats_up, www.gboats.com/uploads/sites/f/GH/boatsshowroom/mode/1754/angler_v172_c_flip_deck_seats_up.jps, site visited May 10, 2017.
Lund impact-flip-up-seats, www.lundboats.com/up-content/uploads/impact-flip-up-seats.jps, site visited May 10, 2017.
Scout Boats removable jump seat, www.scoutboats.com/up-content/gallery/225-xsf/03-225xsf_Aftseat.jpg?x17819, site visited May 10, 2017.

* cited by examiner

MARINE VESSELS AND MODULAR DECK AND SEATING CONFIGURATIONS FOR MARINE VESSELS

FIELD

The present disclosure relates to marine vessels and more particularly to modular deck and seating configurations for marine vessels.

BACKGROUND

The following U.S. Patents provide background art and are hereby incorporated herein by reference: U.S. Pat. Nos. 9,260,166; 9,126,664; 9,021,975; 8,899,169; 8,899,916; 8,517,466; 7,677,668 and 7,513,211.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter. In certain examples disclosed herein, a marine vessel has a deck surface with a recessed cavity; a seat module having a seating member, an engagement member, and a hinge that couples the seating member to the engagement member; and a retainer configured to retain the engagement member with respect to the recessed cavity. The seating member is pivotable about the hinge into and between a closed position in which the seating member side lies flush with the deck surface and covers the recessed cavity and an open position in which the seating member provides seating for a user and the recessed cavity is exposed and provides leg room for the user.

BRIEF DESCRIPTION OF THE DRAWINGS

The present disclosure is described with reference to the following drawing Figures.

DETAILED DESCRIPTION OF THE DRAWINGS

Figure 1:
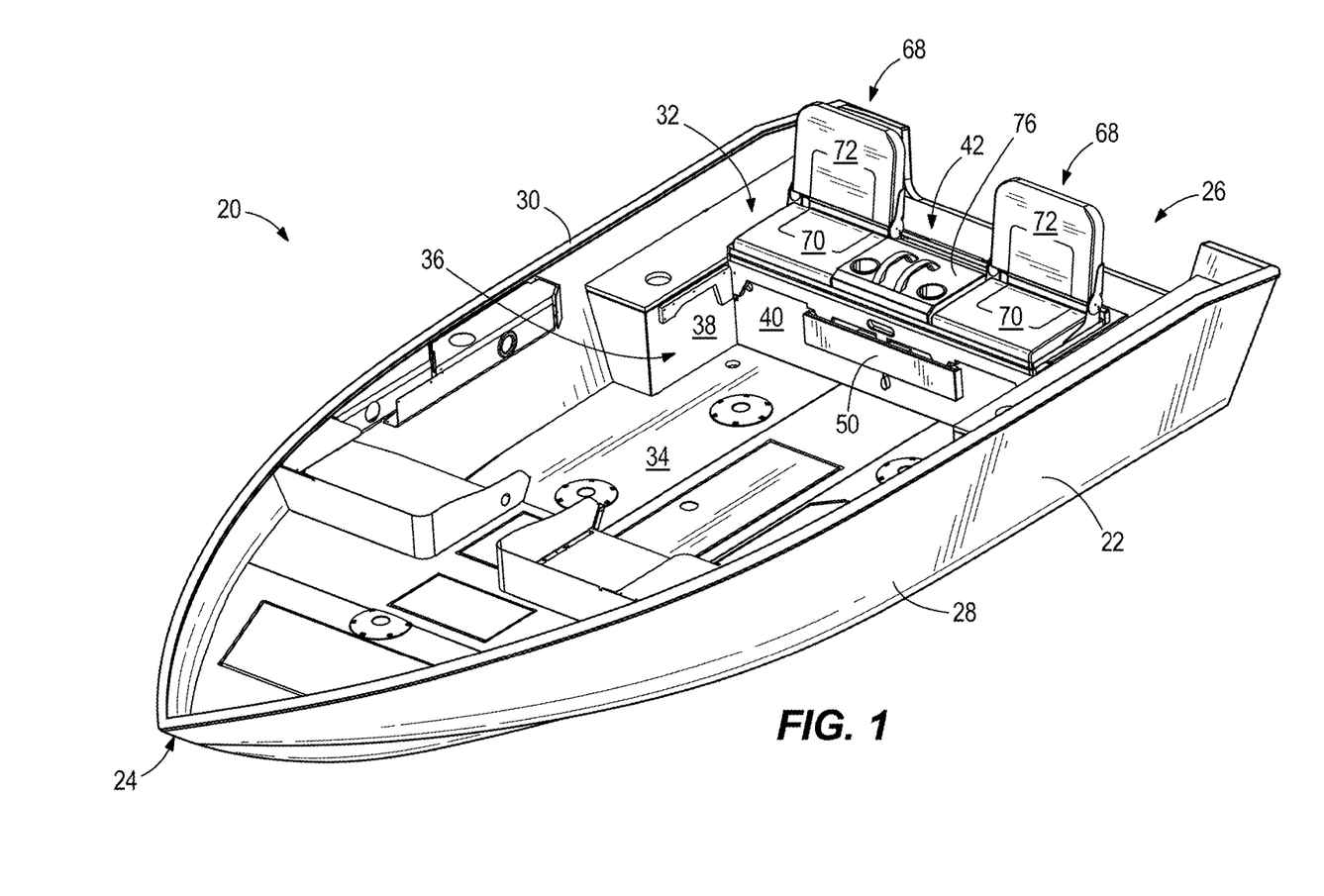
FIG. 1 is a perspective view of a marine vessel having a deck surface and a seating module according to the present disclosure.

FIG. 1 depicts a marine vessel 20 having a conventional hull configuration 22 including a bow 24, a stern 26, and port and starboard sides 28, 30 that each extend from the bow 24 to the stern 26. Proximate to the stern 26, the marine vessel 20 has a deck surface 32 that is located above a bottom or floor 34 of the hull configuration 22. The deck surface 32 defines a recessed cavity 36 between opposing sidewalls 38 and an end wall 40 extending between the sidewalls 38. The sidewalls 38 and end wall 40 extend transversely downwardly from the deck surface 32 towards the floor 34. The recessed cavity 36 has an open forward end and an aftward end that is closed by the end wall 40.

Figure 2:
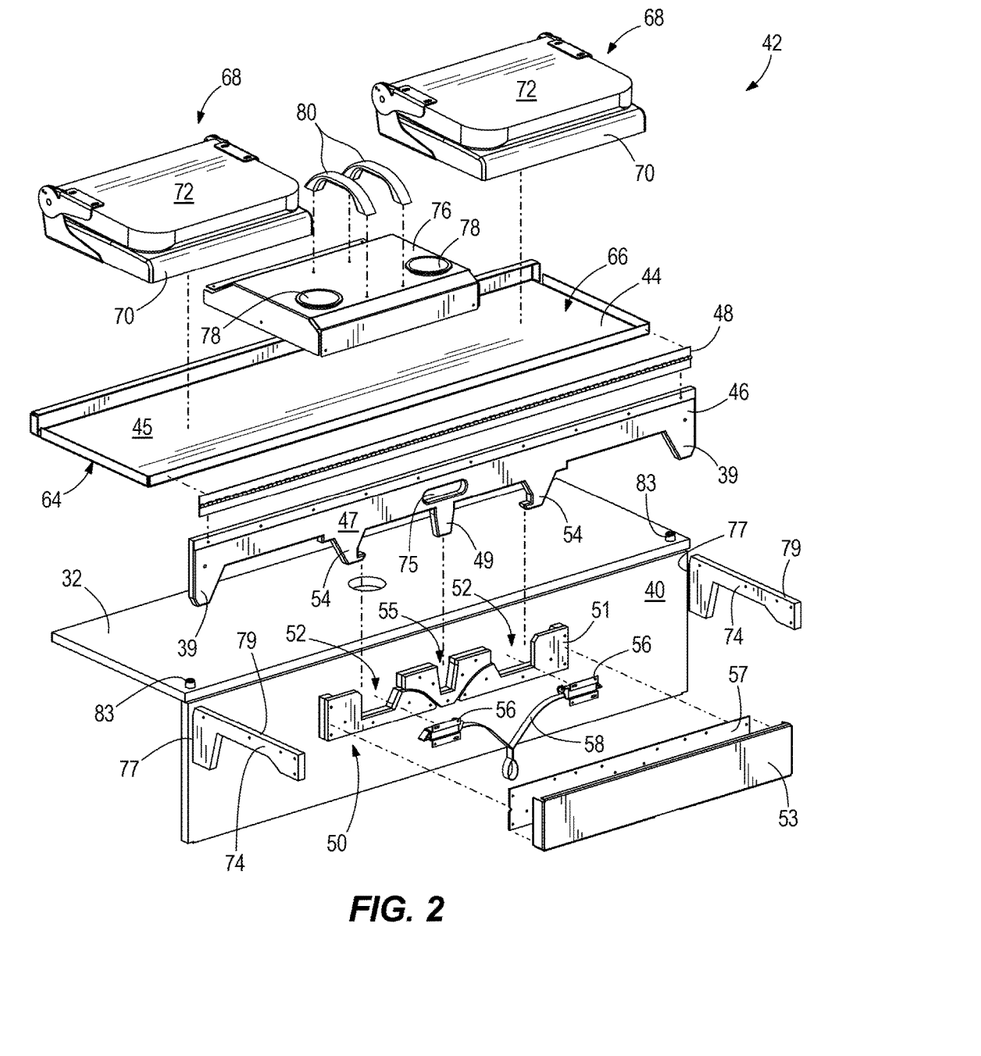
FIG. 2 is an exploded view of a portion of the deck surface and the seating module.

Referring to FIGS. 1 and 2, a seat module 42 according to the present disclosure is configured to provide seating for passengers in the marine vessel 20 and alternately to close the recessed cavity 36 and provide an expanded deck surface 32, as described further herein below.

As shown in FIG. 2, the seat module 42 is manually removable from the deck surface 32 and has a seating member 44, an engagement member 46, and a hinge 48 that pivotably connects the seating member 44 to the engagement member 46. The particular configuration of the seating member 44, engagement member 46, and hinge 48 can vary from what is shown. In the illustrated example, the seating member 44 has a planar base 45 having a width that is slightly smaller than the distance between the sidewalls 38 and a depth that is the same as or slightly smaller than the distance between the end wall 40 and the sidewalls 38 at the forward end. The respective dimensions can vary from what is shown and described. The engagement member 46 is a planar member 47 and, as described further herein below, is configured to engage the seating module 42 with the marine vessel 20 and particularly with respect to the deck surface 32 and recessed cavity 36. The engagement member 46 has a width that is slightly smaller than the distance between the sidewalls 38, so that the engagement member 46 can fit widthwise into the recessed cavity 36. The hinge 48 is an elongated, piano-type hinge that facilitates pivoting movement of the seating member 44 and engagement member 46 with respect to each other. The hinge 48 has opposing elongated sides that are fastened to the seating member 44 and engagement member 46, respectively. The hinge 48 extends along a majority of the width of the respective members 44, 46; however the configuration of the hinge 48 can vary from what is shown. In other examples, the hinge 48 can include a plurality of smaller hinges that are spaced apart along the width of the respective members 44, 46.

As shown in FIG. 2, the engagement member 46 includes a pair of hooks 54 that are inwardly oriented towards each other and extend downwardly from a lower edge of the planar member 47. An alignment protrusion 49 is disposed between the pair of hooks 54 and also extends downwardly from the lower edge of the planar member 47. A pair of outer alignment protrusions 39 are disposed on opposite ends of the planar member 47.

A retainer 50 is disposed in the recessed cavity 36 on the end wall 40 and is configured to retain the engagement member 46 with respect to the deck surface 32. In the illustrated example, the retainer 50 includes a pair of retainer envelopes 52 that are configured to receive the pair of hooks 54 and an alignment channel 55 that is configured to receive the alignment protrusion 49. Each of the pair of envelopes 52 and the alignment channel 55 have side surfaces that taper inwardly from top to bottom to thereby funnel the pair of hooks 54 and the alignment protrusion 49 as the engagement member 46 is manually slid into the respective envelopes 52 and alignment channel 55. In the illustrated example, the retainer 50 is formed by a baseboard 51 having cutouts formed therein for defining the envelopes 52 and alignment channel 55 and a structural plate 57 that is attached to the baseboard 51 to further define the envelopes 52 and alignment channel 55 between a backside of the structure plate 57 and the end wall 40. The structure plate 57 has pilot holes for assembly of the retainer 50. A cover board 53 is installed to protect the retainer 50 mechanism from damage and user from pinch point due to engagement with the engagement member 46.

Figure 9:
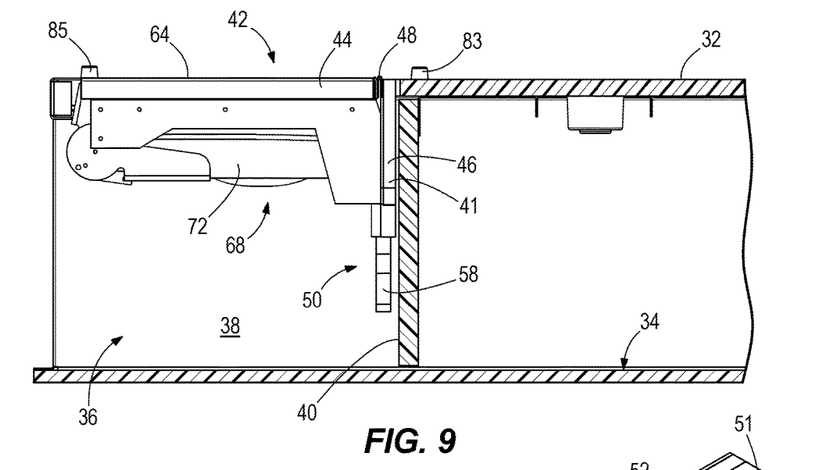
FIG. 9 is a view of section 9-9 taken in FIG. 9.

Support rails 74 located on the opposing sidewalls 38 just below the deck surface 32. The support rails 74 have aftwardly oriented side edges 77 that are spaced apart from the end wall 40 and tapered inwardly from top to bottom, so as to funnel the pair of alignment protrusions 39 as the engagement member 46 is manually slid into engagement with the retainer 50. As described further herein below, the support rails 74 also have top surfaces 79 that support the opposite sides of the seating member 44 when it is moved into the noted closed position, as shown in FIG. 9.

Figure 6:
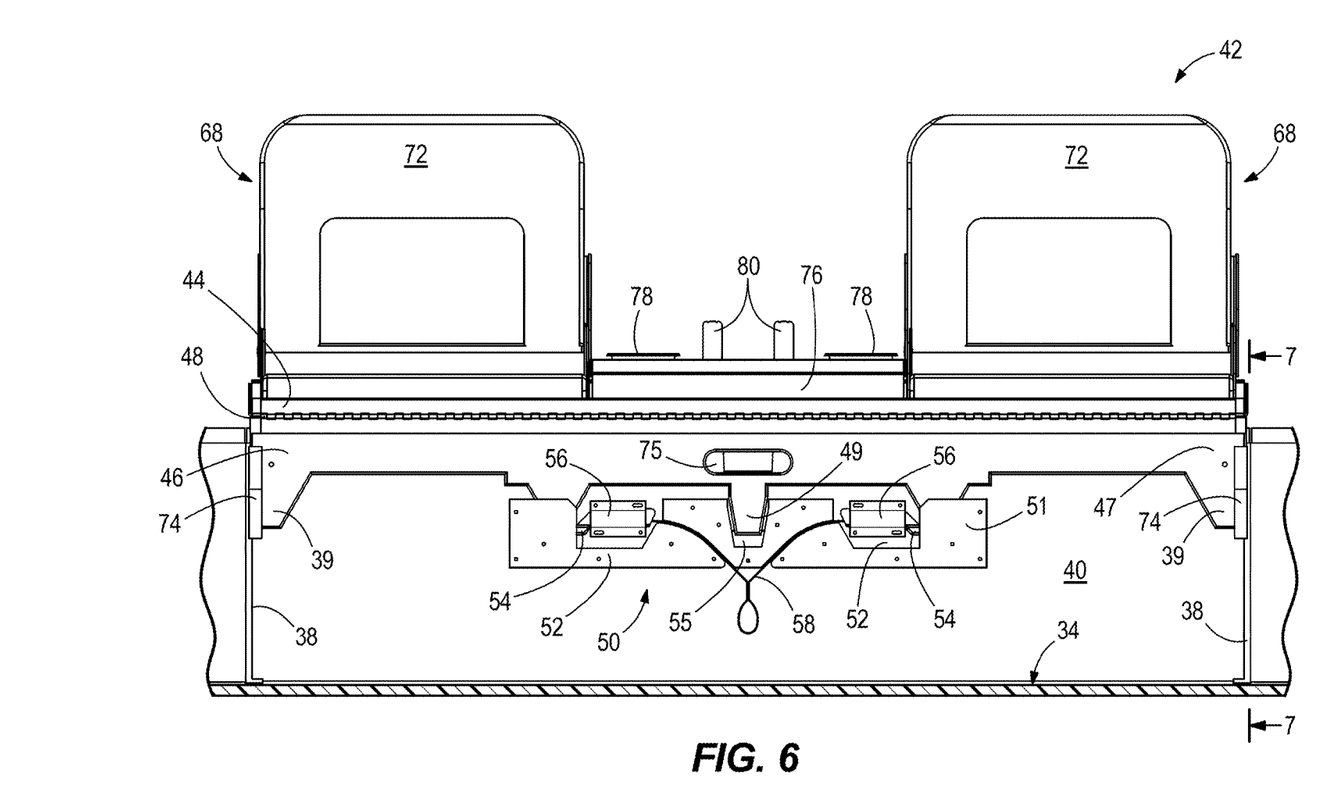
FIG. 6 is a front view of the seating module engaged with the deck surface via a latching assembly.
Figure 7:
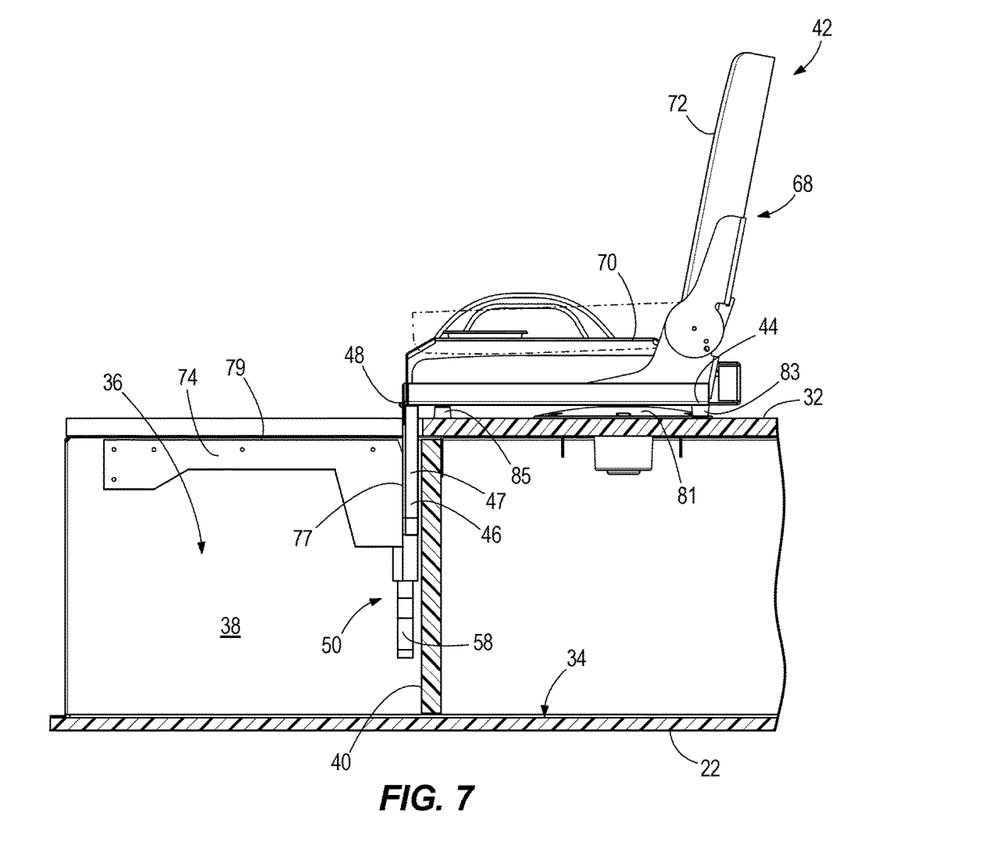
FIG. 7 is a view of section 7-7, taken in FIG. 6.
Figure 8:
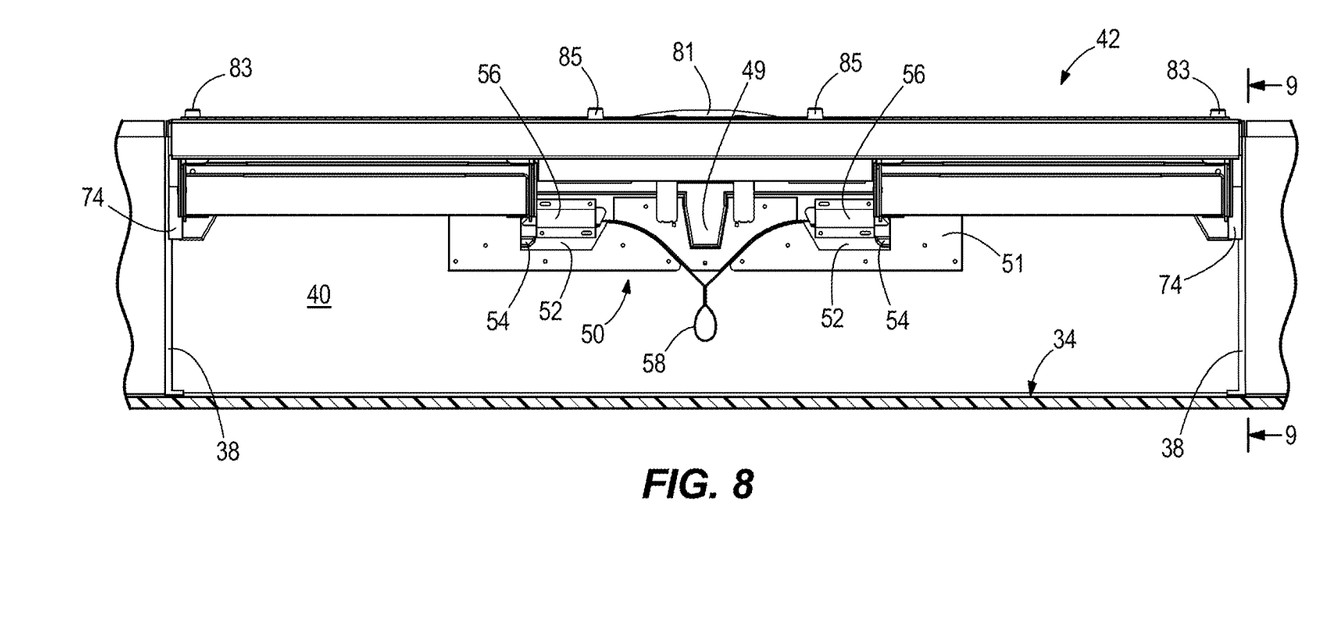
FIG. 8 is a front view of the latching assembly.

A pair of spring-loaded latches 56 are disposed in the respective pair of envelopes 52 and are outwardly oriented with respect to each other and configured to automatically engage with the pair of hooks 54 when the engagement member 46 is manually slid downwardly into the pair of envelopes 52. The spring-loaded latches 56 are similar to door handle latches in that the latches 56 are cammed open against the spring-bias by engagement with the pair of hooks 54 as the engagement member 46 is engaged with the retainer 50. Once the hooks 54 are manually slid past and pass over the latches 56, the spring-bias causes the latches 56 to move back outwardly so as to engage with the hooks 54 and prevent the engagement member 46 from being freely slid back out of the retainer 50. FIG. 6 shows the hooks 54 in engagement with the latches 56 after the engagement member 46 has been slid into the pair of envelopes 52 of the retainer 50.

Figure 10:
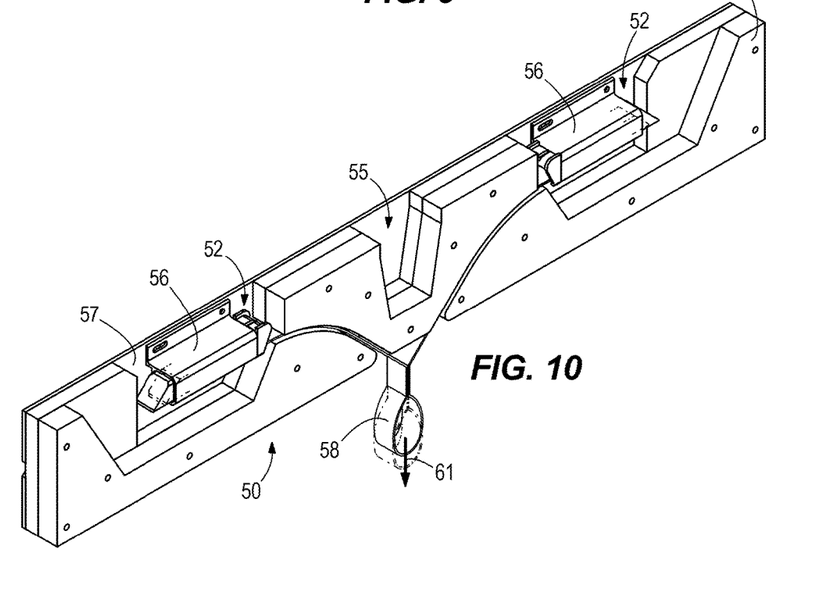
FIG. 10 is an isolated perspective view of the latching assembly.

Referring to FIGS. 6 and 10, a release member 58 is manually actuated or actuated by a foot of the user to open the spring-loaded latches 56 and allow the engagement member 46 to be freely manually slid out of the pair of envelopes 52. In the illustrated example, the release member 58 includes a flexible linking member, which can for example be a belt or rope, that links together the pair of spring-loaded latches 56. Pressing down on the release member 58 in the direction of arrow 61 in FIG. 10 pulls open the pair of spring-loaded latches 56, against the spring bias, and removes the latches 56 from engagement with the pair of hooks 54, so that the engagement member 46 can be manually pulled/slid out of the pair of envelopes 52, clear of the latches 56. This facilitates connection and disconnection of the seat module 42 from the marine vessel 20, and particularly the deck surface 32.

Figure 3:
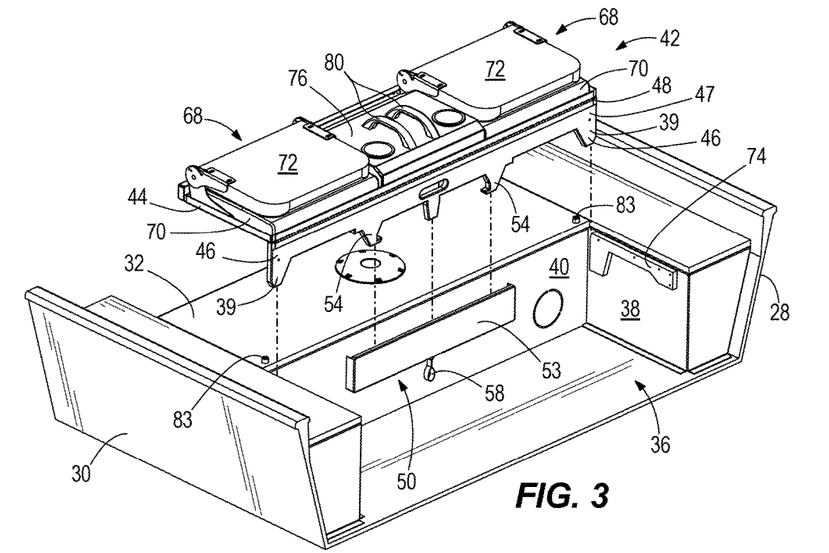
FIGS. 3-5 show the seating module in several positions with respect to the deck surface.
Figure 4:
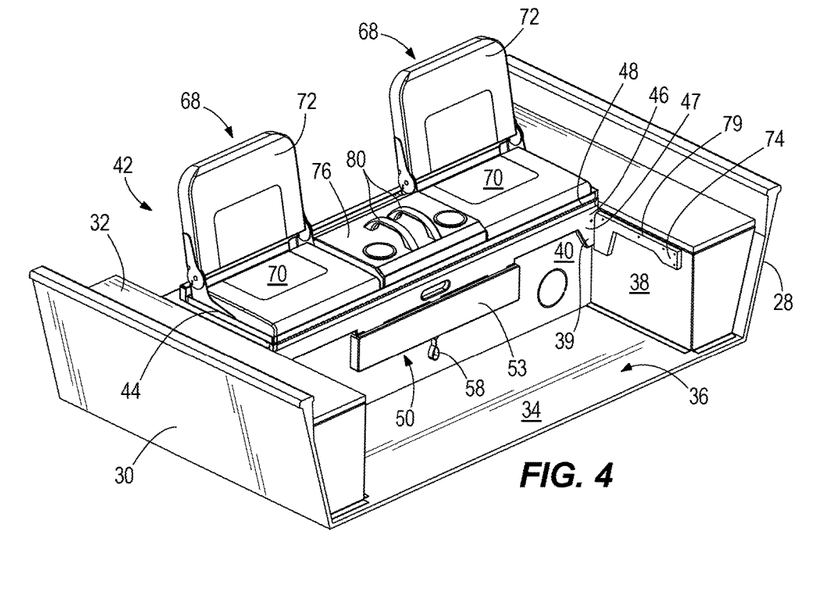
Figure 5:
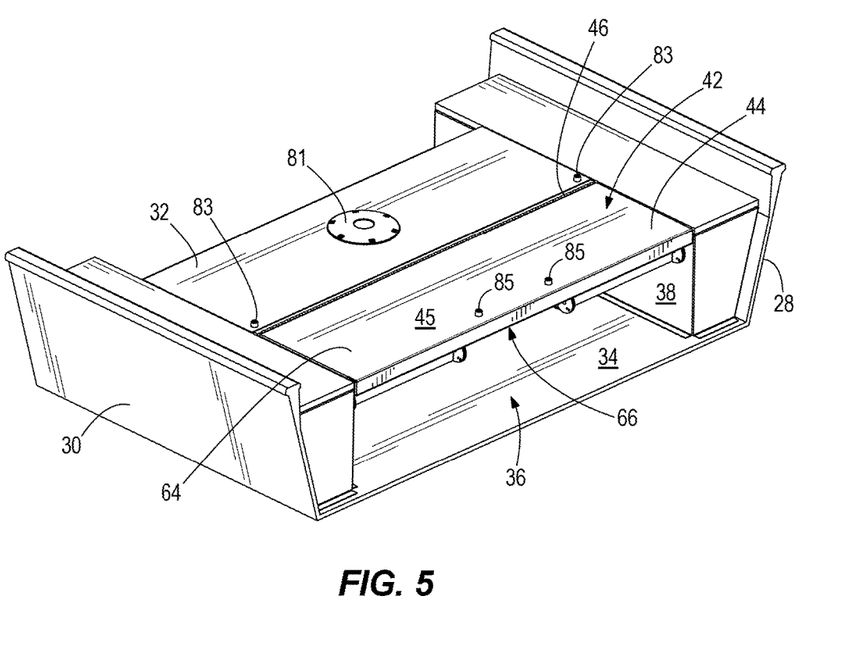

Referring now to FIGS. 3-5, once the engagement member 46 is engaged with the retainer 50, the seating member 44 can be pivoted about the hinge 48 into and between a closed position shown in FIG. 5, in which the seating member 44 lies flush with the deck surface 32 and covers the recessed cavity 36, and an open position shown in FIG. 4, in which the seating member 44 provides seating for a user and the recessed cavity 36 is exposed and provides leg room for the user seated on the seating member 44. As shown by comparison of FIGS. 4 and 5, the seating member 44 pivots through 180 degrees about the hinge 48 between the noted open and closed positions. When the seating member 44 is in the open position shown in FIG. 4, the engagement member 46 extends at a 90 degree angle to the seating member 44. Similarly, when the seating member 44 is in the closed position shown in FIG. 5, the engagement member 46 extends at a 90 degree angle to the seating member 44.

Referring to FIGS. 2 and 7-9, the planar base 45 of the seating member 44 has a first side 64 and an opposite second side 66. When the seating member 44 is in the closed position shown in FIG. 9, the first side 64 lies flush with the deck surface 32 and the second side 66 faces inwardly into the recessed cavity 36. When the seating member 44 is in the open position shown in FIG. 7, the first side 64 faces the deck surface 32. The support rails 74 are located on the opposing sidewalls 38 just below the deck surface 32. The top surfaces 79 of the support rails 74 support opposing sides of the seating member 44 when it is moved into the noted closed position, as shown in FIG. 9. A handle aperture 75 is formed through the engagement member 46 and is configured for manual grasping by the user, thus facilitating movement of the seating module 42 in the manner shown in the drawings.

A pair of cushioned seats 68 are located on the second side 66 of the seating member 44. When the seating member 44 is in the closed position shown in FIG. 9, the pair of seats 68 is disposed in the recessed cavity 36. When the seating member 44 is in the open position shown in FIG. 7, the seats 68 are exposed for use by the user. Each seat 68 includes a cushioned base 70 and a cushioned backrest 72 that is pivotable with respect to the base 70 into and between an upright position shown in solid line in FIG. 7 in which the backrest 72 is transverse to the base 70 and a prone position shown in dashed line in FIG. 7 and solid line in FIG. 9 in which the backrest 72 is parallel to the base 70. In this example, the depth of the recessed cavity 36 is such that the seats 68 only fit into the recessed cavity 36 in the noted prone position. A console 76 is disposed between the pair of seats 68 and includes drink holders 78 for holding a beverage and user handles 80 for the passengers to manually grab while seated.

In use, the seat module 42 is manually connected to the deck surface 32 by sliding the engagement member 46 into engagement with the retainer 50, as shown by dash and dot lines in FIG. 3. Sliding the engagement member 46 into the retainer 50, particularly sliding the pair of hooks 54 and alignment protrusion 49 into the pair of retainer envelopes 52 and alignment channel 55 causes the pair of spring loaded latches 56 to engage with the pair of hooks 54, as described herein above. Simultaneously, the pair of alignment protrusions 39 are guided into the space between the side edges 77 of the support rails 74 and the end wall 40, as shown in dash and dot line in FIG. 3. In the position shown in FIGS. 3 and 4, the seat module 42 is oriented so that the pair of cushioned seats 68 are facing upwardly from the deck surface 32, providing available seating for passengers in the marine vessel 20. The recessed cavity 36 provides space for the passenger's feet.

During transition from the closed position to the open position of the seat module 42, a vertical translation of the engagement member 46 occurs relative to the pedestal seat base 81 on the deck surface 32. The translation occurs when the seating member 44 is raised against the bumpers 83 on the deck surface 32. This gives leverage to the seating member 44, which is attached to the hinge 48 and engagement member 46, to pull the engagement member 46 until the pair of hooks 54 lock under the spring loaded latches 56. At this time, the seat module 42 is in the open and locked position and the planar base 45 is parallel to the deck surface 32 at an approximate distance of ⅝ inch, which is caused by the bumpers 83 on the deck surface 32 and the bumpers 85 on the seating member 44. This allows the seat module 42 to pass over the protrusion of the pedestal seat base 81 and avoids damage to the surface of the seating member 44.

As shown by comparison of FIGS. 4 and 5, the seating member 44 of the seat module 42 is manually pivotable about the hinge 48 into the position shown in FIG. 5, wherein the seating member 44 lies flush with the deck surface 32, thus providing an expanded surface for the user and passengers to walk. In this position, the pair of cushioned seats 68 is disposed in the recessed cavity 36, as the cushioned back rests 72 are first pivoted with respect to the cushioned bases 70 into the noted prone position.

To remove the seat module 42 from the deck surface 32, the seating member 44 is manually pivoted back to the position shown in FIGS. 3 and 4. The user then manually or by foot action presses down on the release member 58 which actuates the spring loaded latches 56 into an open position, thus allowing the engagement member 46 to be freely manually slid out of the pair of envelopes 52, as shown by dash and dot line in FIG. 3.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A marine vessel comprising a deck surface having a recessed cavity; a seat module having a seating member, an engagement member, and a hinge that couples the seating member to the engagement member; and a retainer configured to retain the engagement member with respect to the recessed cavity; wherein the seating member is pivotable about the hinge into and between a closed position in which the seating member lies flush with the deck surface and covers the recessed cavity and an open position in which the seating member provides seating for a user and the recessed cavity is exposed and provides leg room for the user, wherein the seating member pivots 180 degrees about the hinge between the open position to the closed position.

2. The marine vessel according to claim 1, wherein the engagement member extends at a 90 degree angle to the seating member when the seating member is in the open position and when the seating member is in the closed position.

3. The marine vessel according to claim 2, wherein the seating member comprises a base having a first side and an opposite, second side, wherein when the seating member is in the closed position, the first side is flush with the deck surface and the second side faces the recessed cavity.

4. The marine vessel according to claim 3, wherein when the seating member is in the open position the first side faces the deck surface.

5. The marine vessel according to claim 4, further comprising a seat on the second side of the seating member, wherein when the seating member is in the closed position, the seat is disposed in the recessed cavity and when the seating member is in the open position, the seat is exposed for use by the user.

6. The marine vessel according to claim 5, wherein the seat comprises a base and a backrest that is pivotable with respect to the base into and between an upright position in which the backrest is transverse to the base and a prone position in which the backrest is parallel to the base.

7. The marine vessel according to claim 6, wherein the seat only fits into the recessed cavity in the prone position.

8. The marine vessel according to claim 1, wherein the recessed cavity is defined by opposing sidewalls and an end wall that extend transversely downwardly from the deck surface, and wherein the retainer is on the end wall.

9. The marine vessel according to claim 8, further comprising support rails disposed in the recessed cavity on the opposing sidewalls, wherein the opposing support rails support the seating member in the closed position.

10. A marine vessel comprising a deck surface having a recessed cavity; a seat module having a seating member, an engagement member, and a hinge that couples the seating member to the engagement member; and a retainer configured to retain the engagement member with respect to the recessed cavity; wherein the seating member is pivotable about the hinge into and between a closed position in which the seating member lies flush with the deck surface and covers the recessed cavity and an open position in which the seating member provides seating for a user and the recessed cavity is exposed and provides leg room for the user;
  wherein the recessed cavity is defined by opposing sidewalls and an end wall that extends transversely downwardly from the deck surface, and wherein the retainer is on the end wall;
  further comprising support rails disposed in the recessed cavity on the opposing sidewalls, wherein the opposing support rails support the seating member in the closed position;
  wherein the retainer comprises an envelope and wherein the engagement member is planar and is manually slide-able into and out of the envelope.

11. The marine vessel according to claim 10, further comprising a latch that engages the engagement member with the envelope when the engagement member is slid into the envelope.

12. The marine vessel according to claim 11, further comprising a release member that can be manually actuated or actuated by a foot of the user to open the latch and allow the engagement member to be manually slid out of the envelope.

13. The marine vessel according to claim 11, wherein the engagement member comprises a pair of hooks, wherein the retainer comprises a pair of envelopes that receive the pair of hooks, and wherein the latch is one of a pair of spring-loaded latches that automatically engage with the pair of hooks when the pair of hooks is slid into the pair of envelopes.

14. The marine vessel according to claim 13, further comprising a release member comprising a linking member that links the pair of spring-loaded latches, wherein pressing down on the release member opens the pair of spring loaded latches so that the pair of hooks can be manually pulled out of the pair of envelopes.

15. A modular seating device comprising a seat module having a seating member, an engagement member, and a hinge that couples the seating member to the engagement member, wherein the seating member is pivotable about the hinge into and between a closed position in which the support side lies flush with a deck surface of the marine vessel and covers a recessed cavity in the deck surface, and an open position in which the seating member provides seating for a user and the recessed cavity is exposed and provides leg room for the user;
  wherein the seating member pivots 180 degrees about the hinge from the open position to the closed position, and wherein the engagement member extends at a 90 degree angle to the seating member when the seating member is in the open position and when the seating member is in the closed position.

16. The modular seating device according to claim 15, wherein the seating member comprises a base having a first side and an opposite, second side, wherein when the seating member is in the closed position, the first side is flush with the deck surface and the second side faces the recessed cavity and wherein when the seating member is in the open position the first side faces the deck surface, and further comprising a seat on the second side of the seating member, wherein when the seating member is in the closed position, the seat is disposed in the recessed cavity and when the seating member is in the open position, the seat is exposed for use by the user.

17. The modular seating device according to claim 16, wherein the seat comprises a base and a backrest that is pivotable with respect to the base into and between an upright position in which the backrest is transverse to the base and a prone position in which the backrest is parallel to the base.

18. The modular seating device according to claim 17, wherein the seat is one of a pair of seats on the second side of the seating member.

19. A marine vessel comprising a deck surface having a recessed cavity; a seat module having a seating member, an engagement member, and a hinge that couples the seating member to the engagement member; and a retainer configured to retain the engagement member with respect to the recessed cavity; wherein the seating member is pivotable about the hinge into and between a closed position in which the seating member lies flush with the deck surface and covers the recessed cavity and an open position in which the seating member provides seating for a user and the recessed cavity is exposed and provides leg room for the user, wherein the retainer comprises an envelope and wherein the engagement member is planar and is manually slide-able into and out of the envelope.

20. The marine vessel according to claim 19, further comprising a latch that engages the engagement member with the envelope when the engagement member is slid into the envelope.

\* \* \* \* \*